United States Patent
Ho et al.

(10) Patent No.: US 9,282,372 B1
(45) Date of Patent: *Mar. 8, 2016

(54) METHOD AND SYSTEM TO AUTOMATICALLY SELECT DATA NETWORK VIDEOS AS TELEVISION SHOWS BASED ON A PERSONA

(71) Applicant: TP Lab, Inc., Palo Alto, CA (US)

(72) Inventors: Chi Fai Ho, Palo Alto, CA (US); Shin Cheung Simon Chiu, Palo Alto, CA (US); Bok Knun Randolph Chung, Los Altos, CA (US)

(73) Assignee: TP Lab, Inc., Palo Alto, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/747,473

(22) Filed: Jan. 22, 2013

Related U.S. Application Data

(63) Continuation of application No. 12/421,432, filed on Apr. 9, 2009, now Pat. No. 8,387,094.

(51) Int. Cl.
*H04N 5/445* (2011.01)
*H04N 7/173* (2011.01)
*H04N 21/472* (2011.01)
*H04N 21/278* (2011.01)
*H04N 21/466* (2011.01)

(52) U.S. Cl.
CPC ........... *H04N 21/472* (2013.01); *H04N 21/278* (2013.01); *H04N 21/4668* (2013.01)

(58) Field of Classification Search
CPC .......... H04N 21/4508; H04N 21/4532; H04N 21/466; H04N 21/4668; H04N 21/27; H04N 21/278

USPC .............................................. 725/46, 51, 105
See application file for complete search history.

(56) References Cited

U.S. PATENT DOCUMENTS

| | | | | |
|---|---|---|---|---|
| 5,805,784 | A * | 9/1998 | Crawford | 345/473 |
| 6,408,309 | B1 * | 6/2002 | Agarwal | |
| 6,898,762 | B2 * | 5/2005 | Ellis et al. | 715/716 |
| 7,822,821 | B2 * | 10/2010 | Foote | 709/206 |
| 8,171,032 | B2 * | 5/2012 | Herz | 707/748 |
| 8,180,858 | B2 * | 5/2012 | Robb et al. | 709/219 |
| 8,296,660 | B2 * | 10/2012 | Macadaan et al. | 715/751 |
| 8,387,094 | B1 * | 2/2013 | Ho et al. | 725/46 |
| 2002/0138836 | A1 * | 9/2002 | Zimmerman | 725/46 |
| 2003/0149580 | A1 * | 8/2003 | Moores et al. | 705/1 |
| 2004/0049787 | A1 * | 3/2004 | Maissel et al. | 725/46 |
| 2007/0036287 | A1 * | 2/2007 | Campbell | 379/67.1 |
| 2007/0061022 | A1 * | 3/2007 | Hoffberg-Borghesani | G05B 19/0426 700/83 |

(Continued)

*Primary Examiner* — James R Sheleheda

(74) *Attorney, Agent, or Firm* — North Shore Patents, P.C.; Michele Liu Baillie

(57) ABSTRACT

A system includes a television set for displaying a video for a viewer. The television set connects to a persona television system over a data network and sends a request for a television show for a persona to the persona television system. A "persona" includes a character representation of a person other than the viewer, an event, or a group. The persona television system selects a television show based on the persona. The persona television system sends to the television set a show description of the television show. The show description includes video source information about video source such that the television set can obtain television show from video source. In this manner, a data network video is automatically selected as a television show based on a persona and provided to the television set, increasing the ease with which the viewer can identify video choices of interest.

27 Claims, 7 Drawing Sheets

(56) References Cited

U.S. PATENT DOCUMENTS

| | | | |
|---|---|---|---|
| 2007/0066396 A1* | 3/2007 | Weston | A63F 13/98 463/39 |
| 2007/0133947 A1* | 6/2007 | Armitage | G06F 17/30256 386/224 |
| 2007/0162502 A1* | 7/2007 | Thomas et al. | 707/104.1 |
| 2007/0168237 A1* | 7/2007 | Campbell | 705/5 |
| 2007/0179863 A1* | 8/2007 | Stoll | 705/26 |
| 2007/0239522 A1* | 10/2007 | Kunz et al. | 705/14 |
| 2008/0091692 A1* | 4/2008 | Keith et al. | 707/100 |
| 2008/0097867 A1* | 4/2008 | Engle | G06Q 30/02 705/26.7 |
| 2009/0112680 A1* | 4/2009 | Dovrath et al. | 705/9 |
| 2009/0187944 A1* | 7/2009 | White et al. | 725/46 |
| 2010/0022301 A1* | 1/2010 | Carpenter | 463/30 |
| 2010/0186041 A1* | 7/2010 | Chu et al. | 725/46 |
| 2011/0154400 A1* | 6/2011 | Johnson et al. | 725/46 |
| 2011/0238503 A1* | 9/2011 | Naini | 705/14.66 |
| 2011/0246560 A1* | 10/2011 | Gibson | 709/203 |
| 2012/0089623 A1* | 4/2012 | Sobotka et al. | 707/751 |
| 2012/0215795 A1* | 8/2012 | Phelon et al. | 707/749 |
| 2013/0066973 A1* | 3/2013 | Macadaan et al. | 709/204 |
| 2013/0104056 A1* | 4/2013 | Halliday et al. | 715/753 |
| 2013/0167168 A1* | 6/2013 | Ellis et al. | 725/12 |

* cited by examiner

METHOD AND SYSTEM TO AUTOMATICALLY SELECT DATA NETWORK VIDEOS AS TELEVISION SHOWS BASED ON A PERSONA

CROSS REFERENCE TO RELATED APPLICATION

The present application is a continuation of co-pending U.S. patent application Ser. No. 12/421,432, filed on Apr. 9, 2009.

BACKGROUND OF THE INVENTION

1. Field

This invention relates generally to media, particularly to a system and method to automatically select a data network video as a television show based on a persona.

2. Related Art

Television is among the many media adopting the new digital age. In 2009, United States will officially switch to digital television broadcast. Most national and local television stations are already broadcasting digital television in addition to the analog format, anticipating the switch off in 2009.

In addition to digital television broadcast, many television shows and programs are also distributed in other digital forms, such as DVD's, digital recording through DVR's, over the Internet as downloadable video files or streaming videos. Video downloading services examples include Apple's iTunes™, Amazon's Unbox™. Streaming television video web portals include Netflix™, Hulu™, Veoh™, websites of CBS™, ABC™, Disney™, and many others. Even cable operators such as Comcast™ offer online streaming television videos on their websites, such as Fancast™.

Vice versa, many online videos are showing up on television sets. For example, AppleTV™ and other set top boxes can play YouTube™ videos on television sets. A digital television set typically includes a PC-input, allowing a consumer to connect a PC to the television set. The consumer can use the television set similar to a normal monitor, and can watch online videos from their favorite websites through the PC. The consumer can watch on the television set the traditional television shows as well as online videos from the Internet.

Mary watches television every night. She enjoys a good two hours of television viewing after dinner every week night. In the past, she would check the television guide for her favorite television shows and tuned to the proper television channels. Today, she can watch her favorite shows, current episodes or episode from earlier seasons on her television set. She even finds shows she missed in past few years when she was not home. Moreover, she enjoys watching on the television set her favorite French television shows found on YouTube™. Last night after she finished her dinner, she prepared a nice cup of tea and leaned back on her couch. She turned on the television. There was not any favorite television show she wanted to see on her cable network. She switched to her AppleTV™ and started thinking what she wanted to see. She flipped down the available shows. Nothing was particularly interesting. She then switched to Netflix™. "Nice old episodes but no thanks," she mumbled. She switched to YouTube™. "Ok, what should I search?" "I just want to relax. I am not going to search," she said. She went to Hulu.com. "Ok, what show do I want to see . . . " After twenty minutes of clicking on the remote, she gave up. "Oh, well. I guess tonight is not a television night."

Having a choice is good for consumers. Having too many choices is, however, confusing to consumers. Mary likes an easy evening with something showing on the television set. No violence. Good comedy, drama, occasionally minor action. Sports like skiing or tennis is good. Often she reads while watching television. When a comedy is showing and there is a good joke, she would switch from reading to watching for the next ten minutes or so to enjoy the good laughs from the comedian.

Mary likes Brooke Shields. Mary especially enjoys Lipstick Jungle, a television series in which Shields co-stars. Mary would love to watch the videos and movies Shields likes. Mary would also like to hear what other fans of Shields watch. Mary thinks she would likely enjoy similar videos as the fans.

Tonight Mary also plans to enjoy the evening with herself watching some television. We hope she will find a television show to watch; a show Shields would enjoy too.

John watches television as well. John likes sports. His favorite athletes include basketball player Kobe Bryant and football quarterback Peyton Manning. John thinks it would be cool to watch similar shows Bryant and Manning would watch. John is also a big fan of actor Sean Connery. John has watched all of Connery's movies. John always wonders what videos Connery like to see. When John turns on his television set and flips to a channel showing a rerun of Star Trek which does not interest John, he always questions why the programming networks cannot show only his favorite television shows.

The above scenarios illustrate the frustrations of viewers when confronted with too many video choices without an easy way to identify those of interest to the viewer. Accordingly, there exists a need to provide a method and a system to automatically select a data network video as a television show based on a persona.

BRIEF SUMMARY OF THE INVENTION

A system includes a television set for displaying a video for a viewer. The television set connects to a persona television system over a data network and sends a request for a television show for a persona to the persona television system. A "persona" includes a character representation of a person other than the viewer, i.e., a third party. The persona television system selects a television show based on the persona. The persona television system sends to the television set a show description of the television show. The show description includes video source information about video source such that the television set can obtain television show from video source. In this manner, a data network video is automatically selected as a television show based on a persona and provided to the television set, increasing the ease with which the viewer can identify video choices of interest.

In one method aspect, the method includes: (a) receiving a request from a television set via a data network, wherein the request comprises a persona name; (b) selecting at least one persona from a persona database based on the persona name in the request, wherein each persona in the persona database comprises a character representation of a person other than a viewer of the television set; (c) selecting at least one show description from a television show library based on the selected persona, wherein each show description in the television show library comprises information for a television show; and (d) sending the selected show description to the television set, wherein the selected show description comprises information for the television show.

In another method aspect, the method includes: (a) sending a request by a television set to a persona television system via a data network, wherein the request comprises a persona name for a persona, wherein the persona comprises a character representation of a person other than a viewer of the television set; (b) receiving at least one show description from the persona television system in response to the request, wherein the received show description comprises information for a television show; and (c) obtaining the television show via the data network using the information for the television show in the received show description.

In one computer program product aspect, the computer program product comprises a computer useable storage medium having a computer readable program, wherein the computer readable program when executed on a computer causes the computer to: (a) receive a request from a television set via a data network, wherein the request comprises a persona name; (b) select at least one persona from a persona database based on the persona name in the request, wherein each persona in the persona database comprises a character representation of a person other than a viewer of the television set; (c) select at least one show description from a television show library based on the selected persona, wherein each show description in the television show library comprises information for a television show; and (d) send the selected show description to the television set, wherein the selected show description comprises information for the television show.

In another computer program product aspect, the computer program product comprises a computer useable storage medium having a computer readable program, wherein the computer readable program when executed on a computer causes the computer to: (a) send a request by a television set to a persona television system via a data network, wherein the request comprises a persona name for a persona, wherein the persona comprises a character representation of a person other than a viewer of the television set; (b) receive at least one show description from the persona television system in response to the request, wherein the received show description comprises information for a television show; and (c) obtain the television show via the data network using the information for the television show in the received show description.

In a system aspect, the system comprises: a television set coupled to a data network; and a persona television system coupled to the data network, comprising a computer and a computer useable storage medium having a computer readable program, wherein the computer readable program when executed on the computer causes the computer to: receive a request from the television set via the data network, wherein the request comprises a persona name; select at least one persona from a persona database coupled to the persona television system based on the persona name in the request, wherein each persona in the persona database comprises a character representation of a person other than a viewer of the television set; select at least one show description from a television show library based on the selected persona, wherein each show description in the television show library comprises information for a television show; and send the selected show description to the television set via the data network, wherein the selected show description comprises information for the television show.

DETAILED DESCRIPTION OF THE INVENTION

The invention provides a method and system for automatically selecting a television show. The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the invention is not intended to be limited to the embodiments shown but is to be accorded the widest scope consistent with the principles and features described herein.

Figure 1:
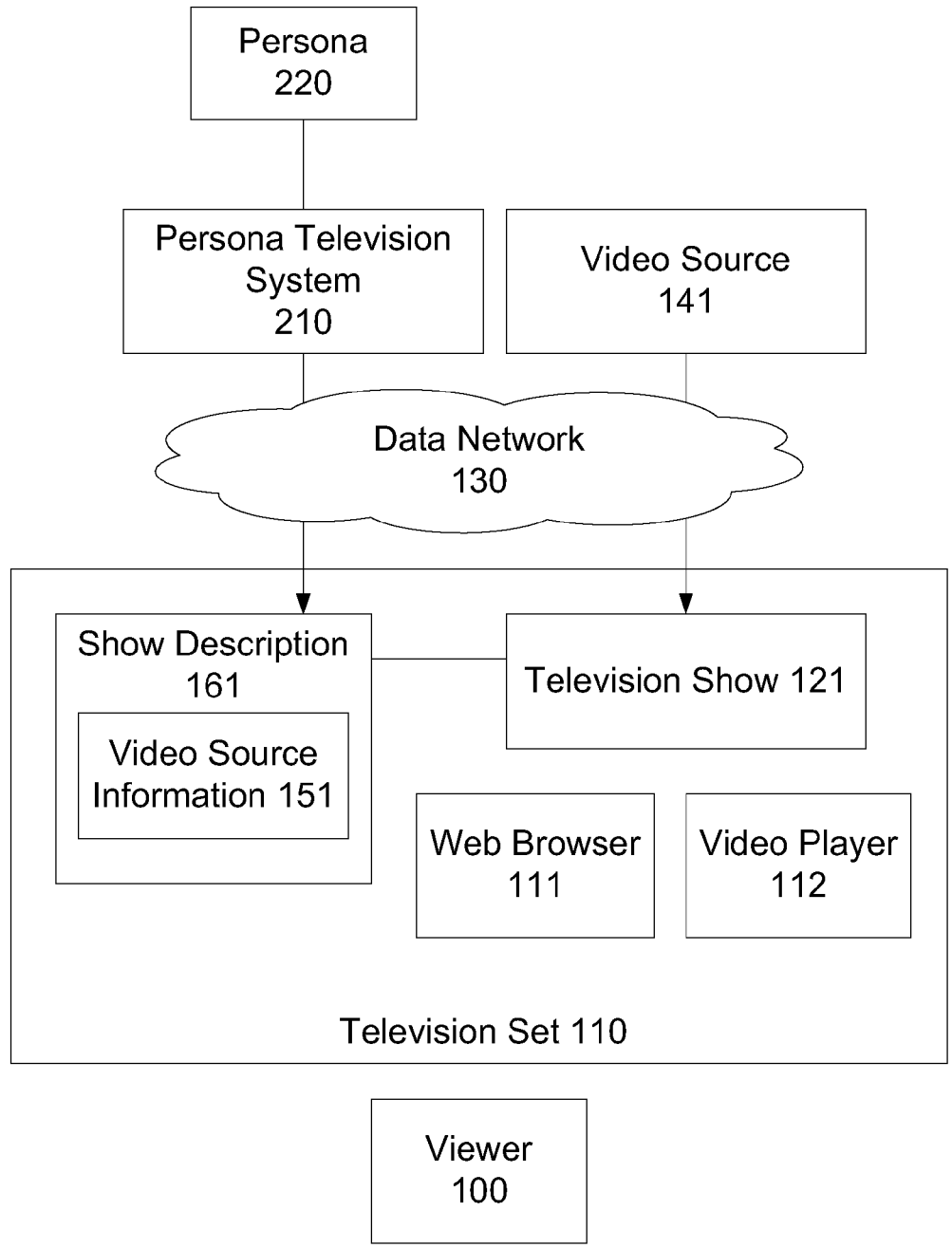
FIG. 1 illustrates an embodiment of a system comprising a television set showing a persona-based selection of data network television shows.

FIG. 1 illustrates an embodiment of a system comprising a television set showing a persona-based selection of data network television shows. The system comprises a television set 110, which displays a television show 121 watched by a viewer 100. The television set 110 obtains the television show 121 from video source 141. The television set 110 connects to video source 141 through a data network 130. The television set 110 connects to the persona television system 210 over the data network 130. In one embodiment, the television set 110 sends a request for a television show for a persona 220 to the persona television system 210. The persona television system 210 selects a television show 121 based on the persona 220 The persona television system 210 sends to the television set 110 a show description 161 of the television show 121. The show description includes video source information 151. Video source information 151 includes information about video source 141 such that the television set 110 can determine video source 141 and can obtain television show 121 from video source 141.

A "persona", as used in this specification, includes a character representation of a person other than the viewer (i.e., a third party), an event, or a group. The persona may include a representation of a real person, event, or group. The persona may also include a representation of a fictional person, event, or group. The persona is described in more detail later in this specification.

Viewer 100 is watching a television show 121 on a television set 110. In one embodiment, television set 110 includes a High Definition Television (HDTV) set. In one embodiment, television set 110 includes a digital media adaptor. In one embodiment, television set 110 includes a set-top-box. In one embodiment, the set-top-box includes a personal computer (PC), or a notebook. In one embodiment, television set 110 includes a mobile entertainment device such as a smartphone, mobile internet device (MID) or a netbook. In one embodiment, television set 110 includes an all-in-one TV. In one embodiment, television set 110 includes a touch sensitive screen.

In one embodiment, television set 110 is located in a living room, a family room, or a bedroom. In one embodiment, television set 110 is located in a residential entertainment room. In one embodiment, television set 110 is placed on a low-profile table, or hung on a wall. In one embodiment, television set 110 is located in a restaurant, a sports bar, or a shopping mall. In one embodiment, television set 110 is located in an airport, a hotel lobby, a hotel guestroom, or a casino. In one embodiment, television set 110 is located over a gas pump in a gas station. In one embodiment, television set 110 is located in a retail store, in a bank, a supermarket or a department store. In one embodiment, television set 110 is located in a reception area of a dental office, a clinic, a hospital, or a governmental office. In one embodiment, television set 110 is located in a ball park, a stadium or a public place, such as a town-square, subway station, or a street corner. In one embodiment, television set 110 is located in an elevator, a billboard, or a digital kiosk. In one embodiment, television set 110 is located in a class room, a lecture hall, or a corporate conference room. In one embodiment, television set 110 is located in an airplane, a passenger car, a bus or a train.

Television set 110 obtains television show 121 from video source 141. In one embodiment, television show 121 is an episode of a television series. In one embodiment, the episode is the current episode from the current season. In one embodiment, the episode is an old episode from the current season. In one embodiment, the episode is an old episode from an old season. In one embodiment, television show 121 is a movie. In one embodiment, television show 121 is a news segment, an interview or a presidential debate. In one embodiment, television show 121 is a sports event, such as a National Football League (NFL) game, an Olympics track and field event, or Miss Universe Pageant. In one embodiment, television show 121 is a documentary, or a city council meeting broadcast. In one embodiment, television show 121 is an animation, or a cartoon animation. In one embodiment, television show 121 is a short video clip, a musical video, or a syndicated video show. In one embodiment, television show 121 is an advertisement. In one embodiment, television show 121 is an online video such as a YouTube video, a user generated video, an online animation such as a Flash animation. In one embodiment, television show 121 is a video clip such as a movie trailer, a news clip, a clip of another video, an animated GIF image.

Television set 110 connects to video source 141 through a data network 130. In one embodiment, data network 130 includes the Internet. In one embodiment, data network 130 includes an Internet Service Provider (ISP) network. In one embodiment, data network 130 includes a Content Delivery Network (CDN). In one embodiment, data network 130 includes a private network operated by or for a business, such as a hotel, a multi-tenant complex, a gym, a rehabilitation center, a casino, a sports bar, a restaurant, a retail shop, a supermarket, a gas station, a train station or a business using television to attract or entertain its customers. In one embodiment, data network 130 includes a home network. In one embodiment, data network 130 includes a broadband network. In one embodiment, data network 130 includes an Ethernet. In one embodiment, data network 130 includes a WiFi network. In one embodiment, data network 130 includes a wireless network such as a Wireless Local Area Network (WLAN), a Worldwide Interoperability for Microware Access (WiMax) network, or an Ultra-Wideband (UWB) network. In one embodiment, data network 130 includes a cellular network, such as a 3G network. In one embodiment, data network 130 includes a digital television network such as a cable television network, a satellite television network, or an IPTV network like Verizon's FiOS™ or AT&T's U-Verse™. In one embodiment, data network 130 includes a digital subscriber line (DSL) network or cable broadband network. In one embodiment, data network 130 includes fiber based subscriber broadband network.

In one embodiment, video source 141 is a broadband television network. In one embodiment, video source 141 is based on Internet Protocol Television (IPTV) technologies. In one embodiment, video source 141 is an Internet video portal or online video syndicate. In one embodiment, video source 141 is an online video store. In one embodiment, video source 141 is an online video portal of a television network. In one embodiment, video source 141 is an online video portal of a television station. In one embodiment, video source 141 is an on-line video rental service. In one embodiment, video source 141 is a web portal. In one embodiment, video source 141 is an online video portal of a newspaper, a news agency, a sport center, a studio, or a video entertainment organization. In one embodiment, video source 141 is an online social networking site. In one embodiment, video source 141 is a home media center, a PC, a cable set-top box, a digital set-top box such as Tivo™, Sling™, or Apple TV™.

Television set 110 obtains television show 121 from video source 141 in a number of ways. In one embodiment, television set 110 obtains television show 121 using a streaming protocol, such as Real Time Messaging Protocol (RTMP). In one embodiment, television set 110 obtains television show 121 using Adobe's Flash™ or Microsoft's Silverlight™ technologies. In one embodiment, television set 110 obtains television show 121 in Moving Pictures Expert Group-2 (MPEG-2) format, MPEG-4 format, or H.264 format, Windows Media Video (WMV), QuickTime video, On2 VP6™ format. In one embodiment, television set 110 obtains television show 121 using Digital Video Broadcasting Terrestrial (DVB-T) or Digital Video Broadcasting Handhelds (DVB-H) technologies. In one embodiment, television set 110 obtains television show 121 using cable television technologies. In one embodiment, television set 110 obtains television show 121 using Media RSS or Synchronized Multimedia Integration Language (SMIL) technology. In one embodiment, television set 110 downloads television show 121 prior to showing television show 121.

In one embodiment, television set 110 shows television show 121 by sending a request to a persona television system 210. In response to the request, persona television system 210 selects television show 121 based on persona 220. Television set 110 connects to persona television system 210 over data network 130. In one embodiment, persona television system 210 sends to television set 110 show description 161 of television show 121. Show description 161 includes video source information 151. Video source information 151 includes information about video source 141 such that television set 110 can determine video source 141 and can obtain television show 121 from video source 141. In one embodiment, video source information 151 includes a television channel number, or an input source of television set 110 such as HDMI-1, RGB, or PC-input. In one embodiment, video source information 151 includes television show 121 title, schedule of when television show 121 is shown, an URL, or a video identity for television show 121. Subsequently television set 110 obtains video source information 151 from show description 161 and goes to video source 141 to obtain television show 121. In one embodiment, television set 110 includes a web browser 111. Using web browser 111, television set 110 uses the URL of source information 151 to go to video source 141. In one embodiment, television set 110 includes a video player 112 such as Windows Media Player™, Flash Player™, Quicktime™ or other media player. Based on video player 112, television set 110 obtains television show 121. In one embodiment, television set 110 downloads television show 121 using web browser 111. In one embodiment, television set 110 downloads television 121 using a file transfer protocol.

Figure 2:
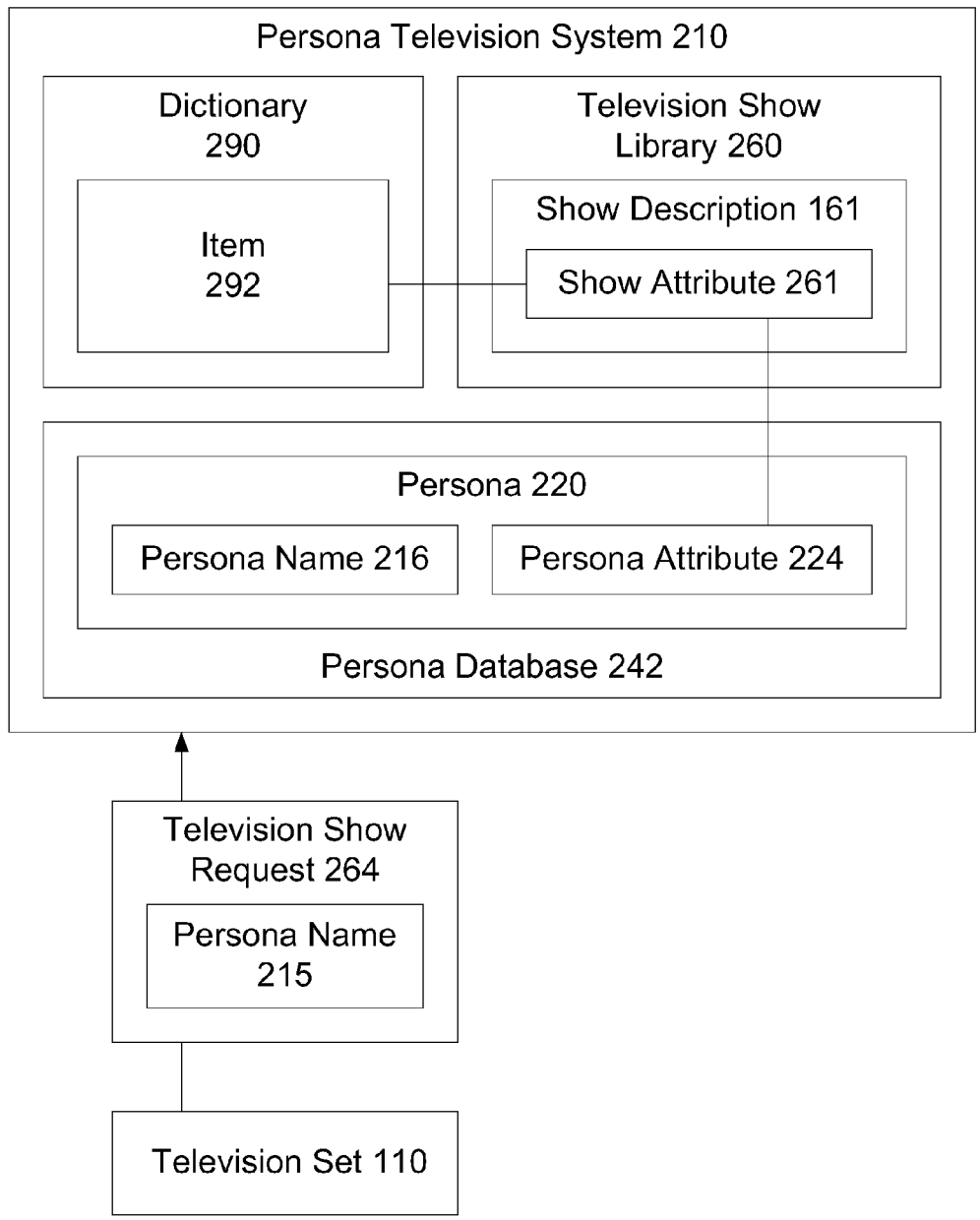
FIG. 2 illustrates an embodiment of a persona television system.

FIG. 2 illustrates an embodiment of a persona television system 210.

Persona television system 210 includes a persona database 242 and a television show library 260. Persona database 242 includes at least one persona 220. In one embodiment, persona 220 represents a person such as an actor, an actress, a director, a writer, an author, a talk show host, a celebrity, a politician, or a teacher. For example, persona 220 represents actor Paul Newman, actress Angelina Jolie, director Steven Spielberg, or producer George Lucas. Other examples include celebrity Paris Hilton, tennis star Ana Ivanovic, President Barack Obama, astronomer Carl Sagan, or talk show host Oprah Winfrey. In one embodiment, persona 220 represents a fictional character from a story, a movie, or a book. For example, persona represents Batman, Super Woman or Looney Tunes' Sylvester. Other examples include Mrs. Robinson of the movie "The Graduate", Santa Claus or Anakin Skywalker. In one embodiment, persona 220 represents an online avatar which in turn is representing a fictional character. In one embodiment, persona 220 represents a character created for a video game such as Spore™ Second Life™, or Sims™. In one embodiment, the persona 220 changes over time based on interaction with other personae.

In one embodiment, persona 220 represents a story, a journal, a historic event, a war, or an incident. For example, persona 220 is based on history of "Oregon Trail". In one example, persona 220 is based on "Star Wars", "Eighty Days around the World", "Tom Sawyer", "World War II", or "Hurricane Katrina". In one embodiment, persona 220 is based on a culture such as Chinese, Japanese, or Greek. Other examples include Egyptian, Incan or the Mesopotamian civilization.

Persona 220 includes at least one persona attribute 224 related to persona 220. In one embodiment, persona attribute 224 describes a human character, academic background, favorite subjects, favorite books, socio-economic background, age group, gender, hobbies, locale, or political views. In one embodiment persona attribute 224 includes a word, an adjective, an adverb, a phrase, a common noun or a paragraph of text. In one embodiment, persona attribute 224 includes a picture, an image, a video clip, a sound, an audio clip, or a music segment.

Figure 2A:
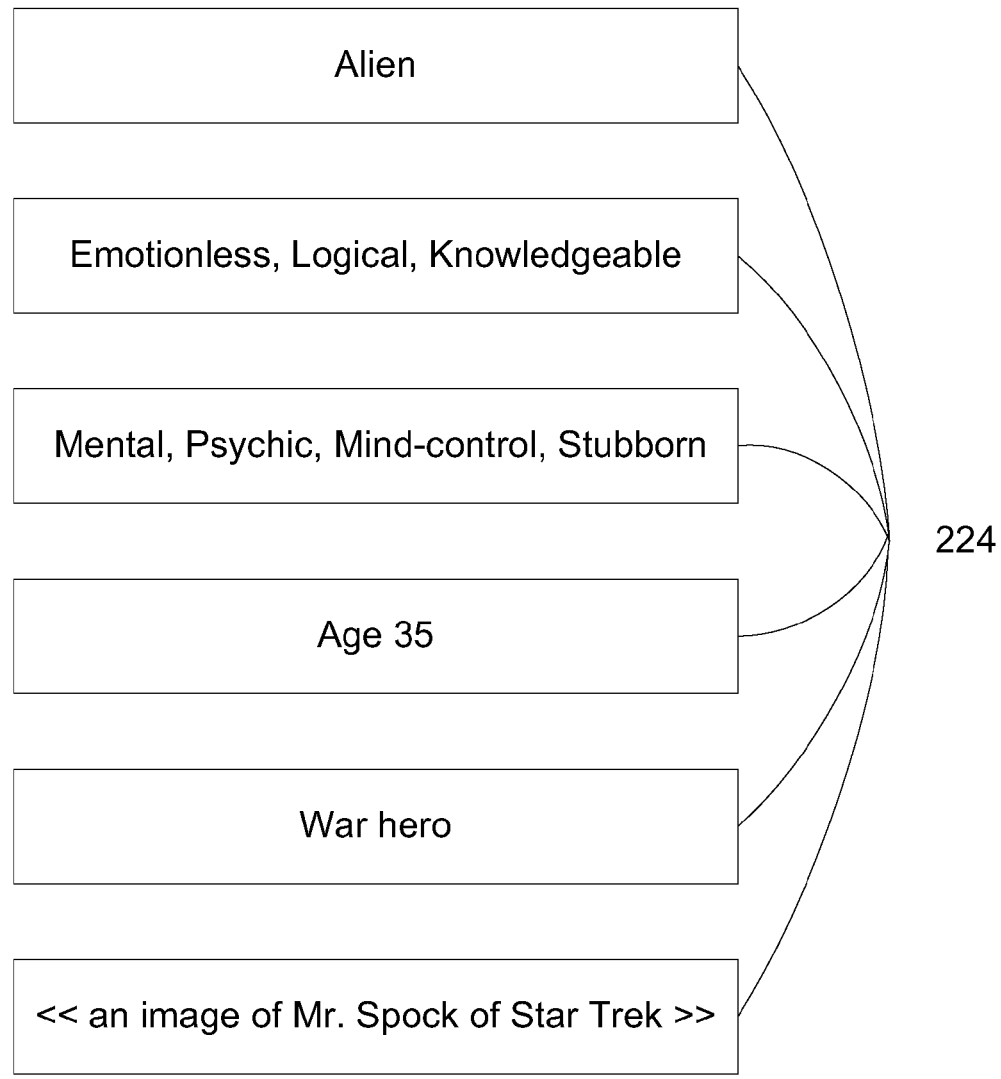
FIG. 2a illustrates examples of persona attributes for a persona.

FIG. 2*a* illustrates example persona attributes 224 for a persona 220 representing a science fiction character persona 220.

Returning to FIG. 2, in one embodiment, persona 220 includes a persona name 216. Persona television system 210 matches the persona name 215 in the television show request 264 with the persona name 216 to obtain persona 220.

Television show library 260 includes at least one show description 161 of a television show. Here, show description 161 describes television show 121. A plurality of show descriptions 161 would describe a plurality of corresponding television shows. In one embodiment, show description 161 includes title of television show 121. In another embodiment, show description 161 includes a description of the story of television show 121, plot, schedule, casts, cast bio, description of characters in television show 121. In one embodiment, show description 161 includes television shows related to television show 121. For example, show description 161 includes other television shows in the same series, by the same producer, with similar cast members, or in the same genre.

Figure 2B:
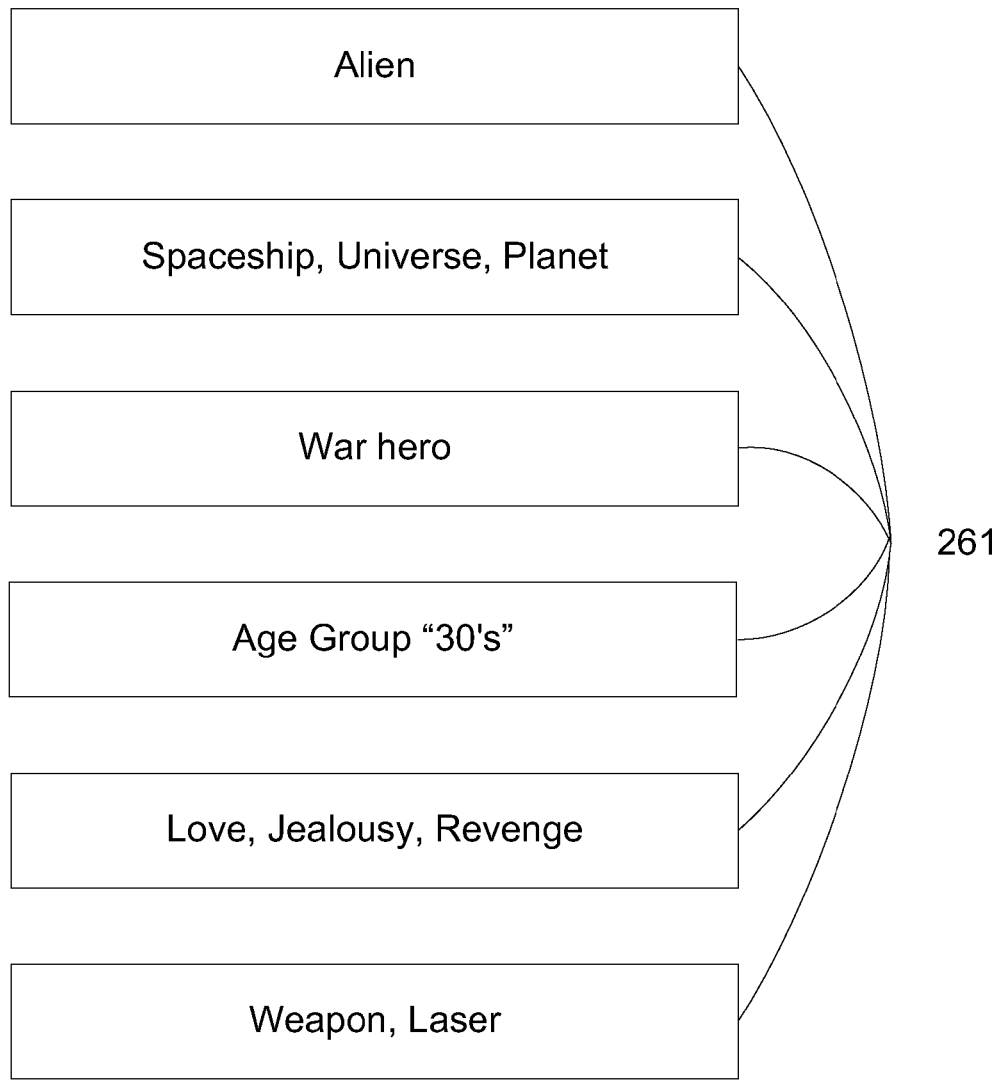
FIG. 2b illustrates examples of show attributes for a show description.

In one embodiment, show description 161 includes a show attribute 261. Show attribute 261 can be a word, a phrase, a noun, a common noun, an adjective, a proper noun, a city name, a phrase, a trademark, etc. FIG. 2*b* illustrates example show attributes 261 of science fiction television show 121. In another embodiment, show description 161 includes a picture, an image, a video clip, a sound, an audio clip, or a music segment.

Persona television system 210 determines if persona 220 matches show description 161 by searching television show library 260. In one embodiment, persona television system 210 compares persona attribute 224 with show attribute 261. In one embodiment, persona attribute 224 is an exact match to show attribute 261. For example in FIG. 2*a* persona attribute 224 is a noun "war hero", and in FIG. 2*b* show attribute 261 is the same noun "war hero". In another example, persona attribute 224 is an age "35" and show attribute 261 is an age group "30's", referring to the target demographic age group of television show 121. In one embodiment, persona attribute 224 is "war hero", and show attribute 261 is "Luke Skywalker". In each of the above examples, persona attribute 224 is determined to "match" show attribute 261.

In one embodiment, persona television system 210 includes a dictionary 290. In one embodiment, dictionary 290 includes item 292 for show attribute 261. In one embodiment, dictionary 290 includes an item 292 of "Luke Skywalker", which includes the term "war hero". Persona television system 210 checks if show attribute 261 is associated with an item 292 in dictionary 290, and compares persona attribute 224 against the associated item 292. Persona television system 210 determines persona attribute 224 matches show attribute 261 based on the item 292 in the dictionary 290.

For example, item 292 describes the city "San Francisco". In one embodiment, item 292 is a word, a term, a phrase, a paragraph, a collection of words, a document, a picture, a video, an audio document or other form of document. In one embodiment, persona attribute 224 is "city life". Persona television system 210 matches "city life" against item 292, which is a description of city "San Francisco", and determines persona attribute 224 matches item 292. Persona television system 210 thus determines persona attribute 224 "city life" matches show attribute 261 "San Francisco" based on item 292 in the dictionary 290.

In one embodiment, persona attribute 224 and show attribute 261 include pictures. Persona television system 210 performs pattern matching between persona attribute 224 and show attribute 261.

As persona television system 210 connects to television set 110, in one embodiment, persona television system 210 receives from television set 110 a television show request 264. In one embodiment, television show request 264 includes persona name 215. Persona television system 210 receives persona name 215 and compares persona name 215 against persona name 216 in persona database 242. Persona television system 210 obtains persona 220 based on persona name 215. Persona television system 210 obtains persona attribute 224 from persona 220. Persona television then compares persona attribute 224 against television show library 260, and determines show attribute 261 of show description 161 matches persona attribute 224. Persona television system 210 sends show description 161 of television show 121 to television set 110. In one embodiment, show description 161 includes video source 141 of television show 121. Persona television system 210 sends video source 141 to television set 110.

Figure 3:
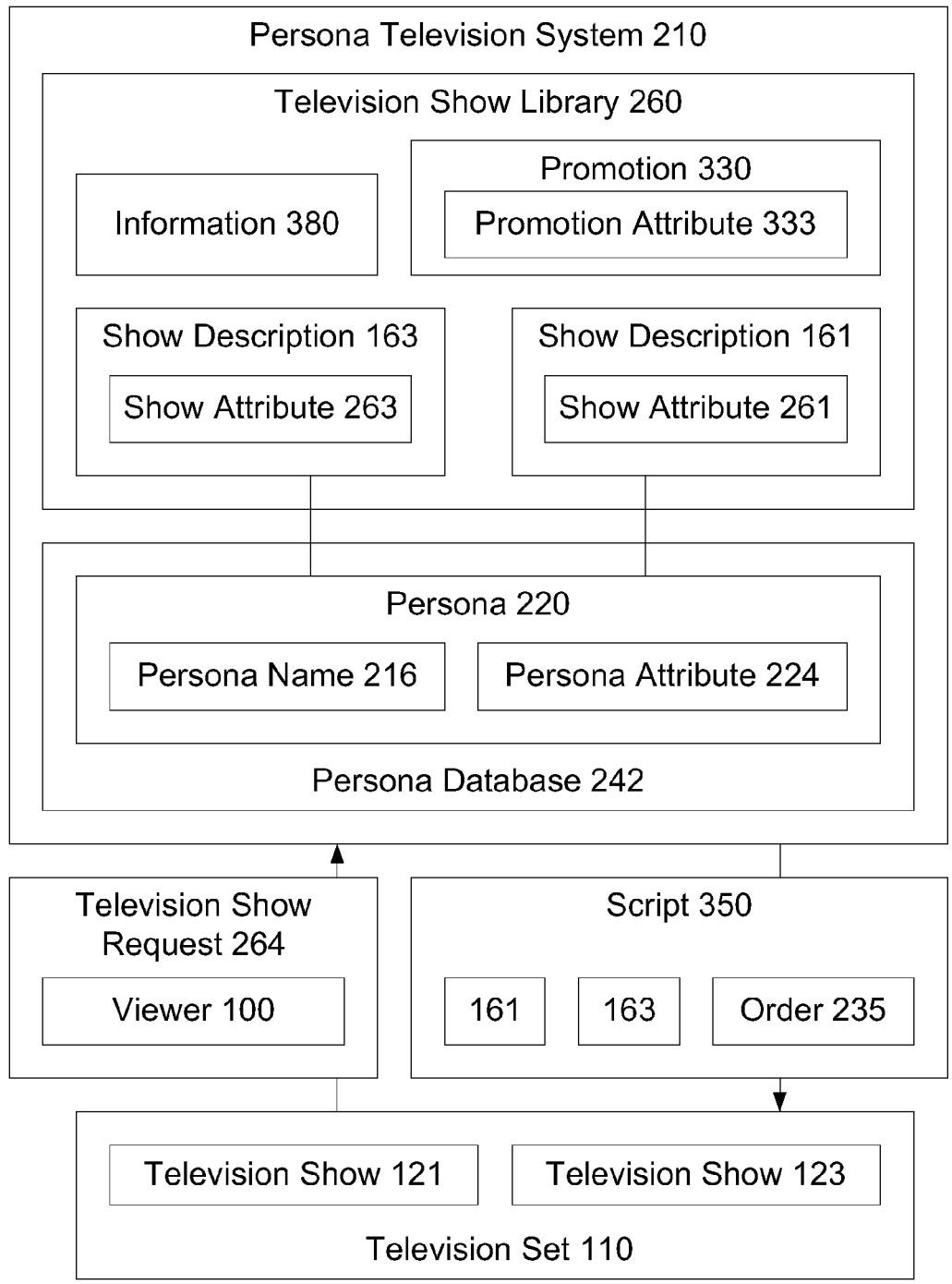
FIG. 3 illustrates an embodiment of a personal television system with a plurality of show descriptions.

In one embodiment as illustrated in FIG. 3, television show library 260 additionally includes a second show attribute 263 of a second show description 163 of a second television show 123. In one embodiment, persona television system 210 determines persona attribute 224 matches show attribute 263, and thus show description 163 matches persona 220. In one embodiment, persona television system 210 sends both show description 161 and show description 163 to television set 110. Television set 110 plays television show 121 and television show 123. In one embodiment, persona television system 210 informs television set 110 a play order 235 for television show 121 and television show 123. Television set 110 plays according to play order 235. In one embodiment play order 235 is a play list including television show 121 and television show 123. In one embodiment play order 235 includes a video on demand list composing of television show 121 and television show 123. Viewer 100 selects television show 123 based on the video on demand list. In one embodiment, viewer 100 selects television show 123 using a remote control.

In one embodiment, persona television system 210 sends television set 110 a television script 350. Script 350 includes instruction to play television show 121 and television show 123. In one embodiment, script 350 is encoded in an Extensible Markup Language (XML). In one embodiment, script 350 is encoded in EMCAScript or Javascript. In one embodiment, script 350 is encoded in Java. In one embodiment, script 350 is encoded in a web scripting language, such as Hypertext Markup Language (HTML). In one embodiment, script 350 is encoded in Visual Basic Script (VBScript).

In one embodiment, persona television system 210 further selects show description 161 from show description 163 based on additional information 380. In one embodiment additional information 380 includes time of day, season, event, etc.

In one embodiment, additional information 380 includes viewer 100 information. Request from television set 110 includes viewer 100 information. Persona television system 210 selects show description 161 from show description 163 further based on viewer 100 information.

In one embodiment, viewer 100 information includes geographic information, past viewing behavior, subscription information. In one embodiment, viewer 100 information includes viewer's age, gender, hobbies, political inclination, favorite actors or actresses, etc.

In one embodiment, the additional information 380 includes promotion 330. Persona television system 210 selects show description 161 from television show library 260 further based on promotion 330. In one embodiment, promotion 330 is for a season, an event, a service, or merchandise. In one embodiment, promotion 330 includes a promotion attribute 333. Promotion attribute 333 is a word, a term, a phrase, a paragraph of text, an image, or a pattern. Persona television system 210 matches promotion attribute 333 against show description 161, similar to the matching of persona attribute 224 against show description 161.

Figure 4:
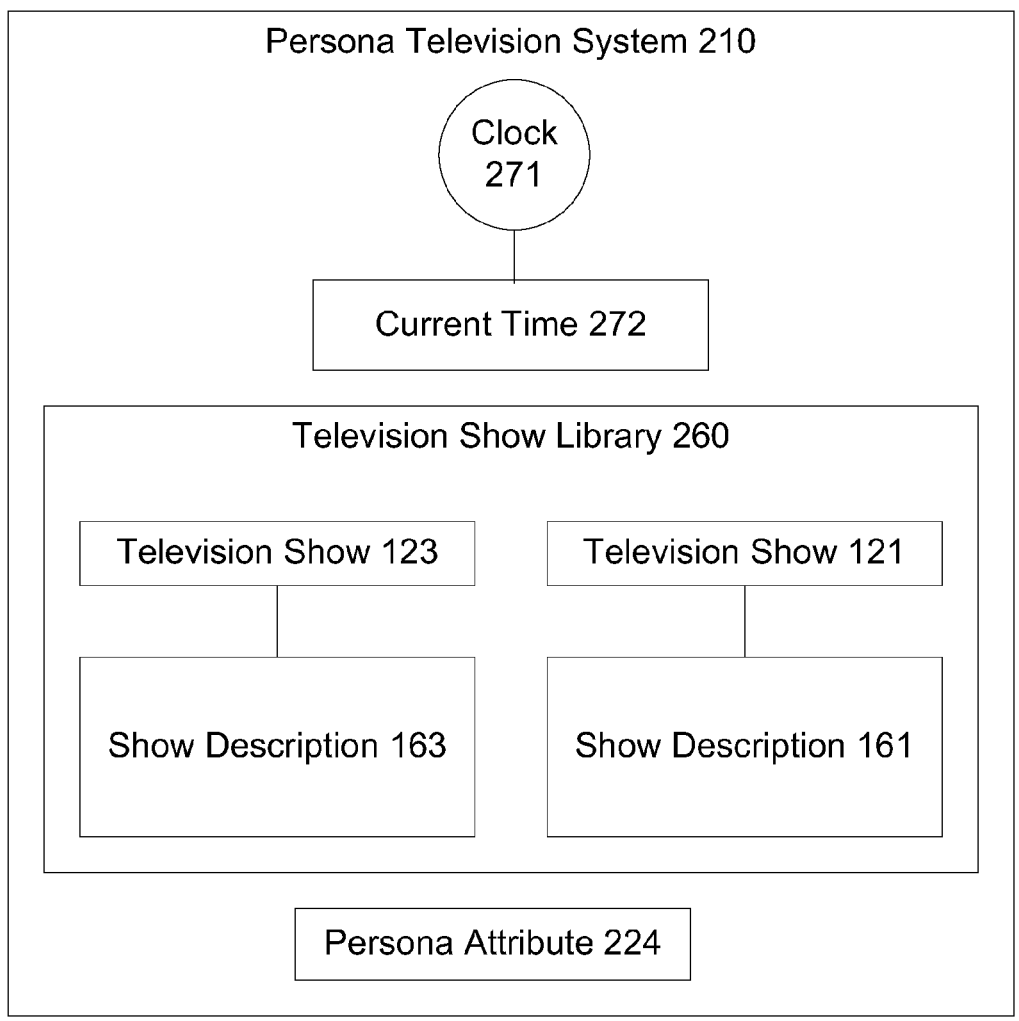
FIG. 4 illustrates persona television system selecting a more relevant television show.

FIG. 4 illustrates persona system selecting a more relevant television show.

In one embodiment, persona television system 210 selects television show 121 and television show 123, both matching persona attribute 224. Persona television system 210 determines television show 121 is more relevant than television show 123 based on a metric.

In one embodiment, relevance is based on time as a metric. Persona television system 210 includes a clock 271 from which persona television system 210 obtains the current time 272, for example Nov. 18, 2008, 12:05 pm. Television show library 260 includes show description 161 for television show 121 wherein show description 161 includes a time or date, such as a publishing date of television show 121 or a period of the year or the day seen in television show 121. Television show library 260 includes similar show description 163 for television show 123. In one embodiment current time 272 is closer to show description 161 than show description 163. Persona television system 210 determines television show 121 is more relevant than television show 123. In one embodiment, current time 272 is close to Thanksgiving, and show description 161 includes Thanksgiving as a period of the year. Television show 121 is more relevant than television show 123. In one embodiment, current time 272 is around noon time, and show description 161 includes noon as a period of the day. Television show 121 is more relevant than television show 123. For example, television show 121 is a video showing how to make a healthy lunch sandwich; television show 121 is a video showing how to prepare a full course dinner. Show description 161 indicates a period of the day between 11 am-1 pm; show description 163 indicates a period of the day between 5 pm-8 pm. Persona television system 210 determines that current time 272 matches show description 161 and that television show 121 is more relevant than television show 123.

In one embodiment, television show 121 is more relevant when show description 161 includes a publishing date later than show description 163.

In one embodiment, relevance is based on other information such as demographic information about viewer 100, location information of television set 110, urgency information of television show library 260. Embodiments of such relevance should be known to those skilled in the art.

In one embodiment, relevance is based on past history of persona television system 210. In one embodiment, television show 121 was selected more recently than television show 123. Persona television system 210 determines television show 121 is more relevant. In one embodiment, television show 121 was more frequently selected than television show 123, television show 121 is more relevant. In one embodiment, television show 121 was watched to completion more frequently than television show 123, television show 121 is more relevant. Other historical information such as social interests, social network interests can also be considered for relevance.

In one embodiment, relevance is based on monetary consideration. In one embodiment, television show 121 is free, for example show description 161 indicates $0 cost, and television show 123 is not free where show description 163 indicates a positive cost. Television show 121 is more relevant than television show 123. In one embodiment, show description 161 indicates revenue higher than show description 163. Television show 121 is more relevant than television show 123.

In one embodiment, relevance is based on popularity or user rating. In one embodiment, show description 161 includes a popularity factor or user rating. For example, show description 161 includes a user rating of 5, higher than the user rating of 3 in show description 163. Television show 121 is more relevant than television show 123.

In one embodiment, persona television system 210 may use one or more of other methods to determine the relevance. The methods may include critic rating, bidding, demographics information, show duration, awards won by television show 121, and video quality.

Upon selecting the more relevant television show, based upon any combination of metrics described above, the persona television system 210 sends the show description for the selected television show to the television set 110. Alternatively, all matching show descriptions are sent to the television set 110 along with their corresponding relevances.

Figure 5:
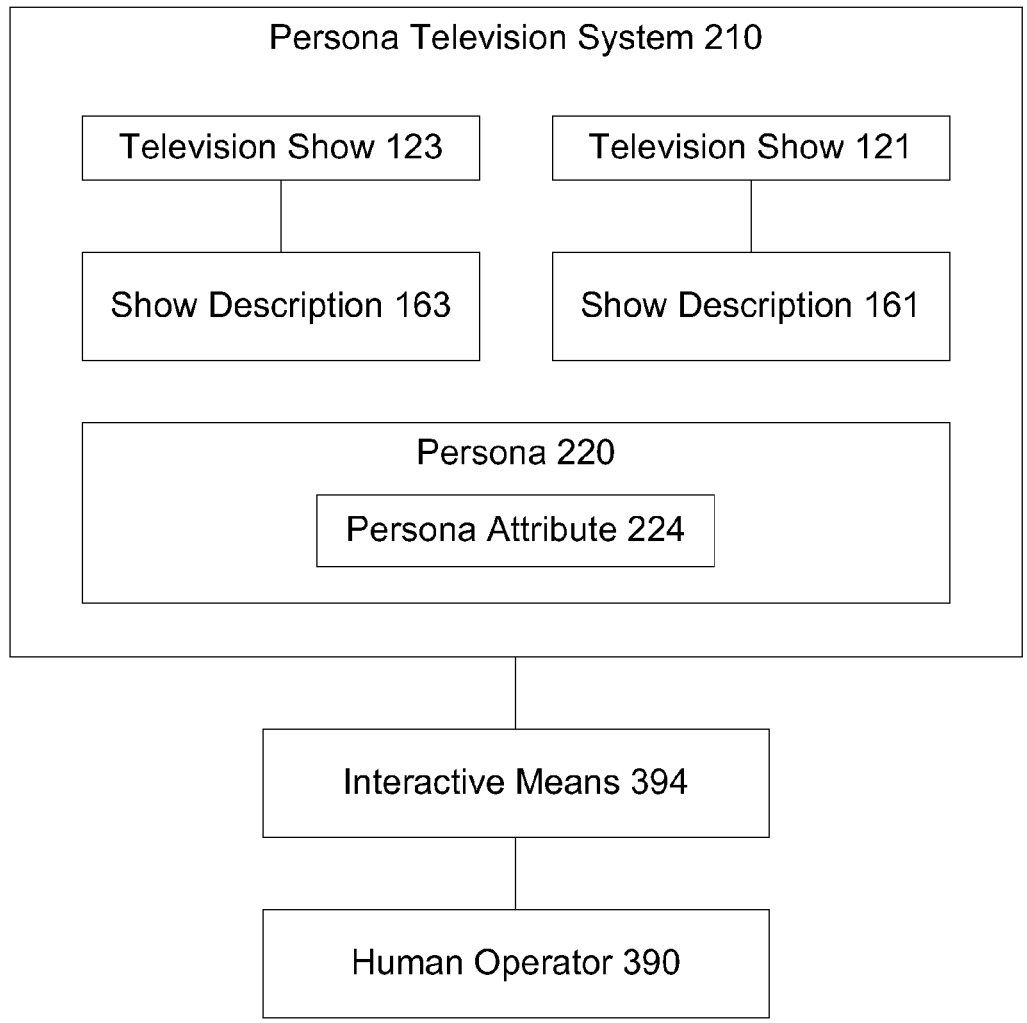
FIG. 5 illustrates a hybrid selection wherein the persona television system includes a human.

FIG. 5 illustrates a hybrid selection wherein the persona television system includes a human.

In one embodiment, persona television system 210 interacts with a human operator 390 to select television show 121. In one embodiment persona television system 210 includes input and output interactive means 394 such as a monitor, a mouse, a touch sensitive screen, a keyboard, a network, a web server, or a web browser. Persona television system 210 interacts with operator 390 using the input and output interactive means 394.

In one embodiment, persona television system 210 presents matched television show 121 to operator 390. Persona television system 210 asks Operator 390 to confirm the matched television show 121. Operator 390 confirms the matched television show 121. Persona television system 210 selects television show 121. In one embodiment, persona television system 210 presents matched television show 121 and television show 123 to operator 390. Persona television system 210 asks operator 390 for further input. Operator 390 responds with television show 121. Persona television system 210 selects television show 121.

In one embodiment, persona television system 210 also presents to operator 390 show description 161, show description 163, persona 220, persona attribute 224, or any additional relevance criteria. Operator 390 confirms or selects television show 121 after reviewing the presented information.

The invention can take the form of an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can contain, store, communicate, propagate, or transport eh program for use by or in connection with the instruction execution system, apparatus, or device.

The storage medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Input/output or I/O devices (including but not limited to keyboards, displays, point devices, etc.) can be coupled to the system either directly or through intervening I/O controllers.

What is claimed is:

1. A method for automatically selecting a television show, comprising:
   (a) comparing a persona name in a request for a television show against a plurality of persona names in a plurality of personas in a persona database, wherein each persona represents a fictional character of a fictional story, wherein each persona changes over time based on interaction with one or more other personas in the persona database;
   (b) selecting at least one persona from the persona database based on the persona name in the request, the selected persona comprising one or more persona attributes, the one or more persona attributes comprising a first image based on the fictional story;
   (c) comparing the selected persona with one or more show descriptions in a television show library, the one or more show descriptions comprising one or more show attributes, the one or more show attributes comprising a second image of a corresponding television show, wherein the comparing comprises comparing the first image with the second image; and
   (d) selecting at least one of the show descriptions comprising the one or more show attributes that comprise the second image matching the first image.

2. The method of claim 1, wherein the selected persona further comprises one or more persona attributes for the fictional character, wherein the comparing (c) and selecting (d) further comprises:
   (c1) comparing the one or more persona attributes for the fictional character in the selected persona with the one or more show attributes in the one or more show descriptions; and
   (d1) selecting at least one of the show descriptions comprising the one or more show attributes that comprise the second image matching the first image and that matches the one or more persona attributes for the fictional character in the selected persona.

3. The method of claim 1, wherein the selected show description comprises information for a television show, wherein the method further comprises:
   (e) sending the information for the television show in the selected show description to a television set.

4. The method of claim 1, wherein the request further comprises one or more promotions, wherein the selecting (d) comprises:
   (d1) selecting the at least one of the show descriptions comprising the one or more show attributes that comprise the second image matching the first image and that matches one or more of the promotions in the request.

5. The method of claim 1, wherein each show description in the television show library corresponds to one or more of the following: an online video; a broadcast television show; or a promotional video.

6. The method of claim 1, wherein one or more of the personas in the persona database represents the fictional character created for a video game, wherein the fictional character created for the video game changes based on interaction with one or more other fictional characters of the video game according to a plot of the video game.

7. The method of claim 1, wherein one or more of the personas in the persona database represents the fictional character of a video, wherein the fictional character of the video changes based on interaction with one or more other fictional characters of the video according to a plot of the video game.

8. A non-transitory computer readable medium having computer readable program code embodied therewith, the computer readable program code configured to:
   (a) compare a persona name in a request for a television show against a plurality of persona names in a plurality of personas in a persona database, wherein each persona represents a fictional character of a fictional story, wherein each persona changes over time based on interaction with one or more other personas in the persona database;
   (b) select at least one persona from the persona database based the persona name in the request, the selected persona comprising one or more persona attributes, the one or more persona attributes comprising a first image based on the fictional story;

(c) compare the selected persona with one or more show descriptions in a television show library, the one or more show descriptions comprising one or more show attributes, the one or more show attributes comprising a second image of a corresponding television show, wherein the compare comprises a compare of the first image with the second image; and (d) select at least one of the show descriptions comprising the one or more show attributes that comprise the second image matching the first image.

9. The medium of claim 8, wherein the selected persona further comprises one or more persona attributes for the fictional character, wherein the computer readable program code configured to compare (c) and select (d) are further configured to:

(c1) compare the one or more persona attributes for the fictional character in the selected persona with the one or more show attributes in the one or more show descriptions; and (d1) select at least one of the show descriptions comprising the one or more show attributes that comprise the second image matching the first image and that matches the one or more persona attributes for the fictional character in the selected persona.

10. The medium of claim 8, wherein the selected show description comprises information for a television show, wherein the computer readable program code is further configured to:

(e) send the information for the television show in the selected show description to a television set.

11. The medium of claim 8, wherein the request further comprises one or more promotions, wherein the computer readable program code configured to select (d) is further configured to:

(d1) select the at least one of the show descriptions comprising the one or more show attributes that comprise the second image matching the first image and that matches one or more of the promotions in the request.

12. The medium of claim 8, wherein each show description in the television show library corresponds to one or more of the following: an online video; a broadcast television show; or a promotional video.

13. The medium of claim 8, wherein one or more of the personas in the persona database represents the fictional character created for a video game, wherein the fictional character created for the video game changes based on interaction with one or more other fictional characters of the video game according to a plot of the video game.

14. The medium of claim 8, wherein one or more of the personas in the persona database represents the fictional character of a video, wherein the fictional character of the video changes based on interaction with one or more other fictional characters of the video according to a plot of the video.

15. The medium of claim 8, wherein each of the one or more show descriptions further comprises a plot of a corresponding television show of a series of shows, wherein the compare (c) and the select (d) comprise:

(c1) compare the selected persona with the plot of the corresponding television show of the series of shows of the one or more show descriptions in the television show library; and (d1) select at least one show description of the one or more show descriptions comprising the plot of the corresponding television show of the series of shows matching the selected persona and comprising the one or more show attributes that comprise the second image matching the first image.

16. The medium of claim 8, wherein each of the one or more show descriptions further comprises a plot of a corresponding episode of a television series, wherein the compare (c) and the select (d) comprise:

(c1) compare the selected persona with the plot of the corresponding episode of the television series of the one or more show descriptions in the television show library; and (d1) select at least one show description of the one or more show descriptions comprising the plot of the corresponding episode of the television series matching the selected persona and comprising the one or more show attributes that comprise the second image matching the first image.

17. A persona television system, comprising:

a computer readable medium having a computer readable program code, the computer readable program code configured to:

(a) compare a persona name in a request for a television show against a plurality of persona names in a plurality of personas in a persona database, wherein each persona represents a fictional character of a fictional story, wherein each persona changes over time based on interaction with other personas in the persona database;

(b) select at least one persona from the persona database based the persona name in the request, the selected persona comprising one or more persona attributes, the one or more persona attributes comprising a first image based on the fictional story;

(c) compare the selected persona with one or more show descriptions in a television show library, the one or more show descriptions comprising one or more show attributes, the one or more show attributes comprising a second image of a corresponding television show, wherein the comparing comprises comparing the first image with the second image; and (d) select at least one of the show descriptions comprising the one or more show attributes that comprise the second image matching the first image.

18. The system of claim 17, wherein the selected persona further comprises one or more persona attributes for the fictional character, wherein the computer readable program code configured to compare (c) and select (d) are further configured to:

(c1) compare the one or more persona attributes for the fictional character in the selected persona with the one or more show attributes in the one or more show descriptions; and (d1) select at least one show of the show descriptions comprising the one or more show attributes that comprise the second image matching the first image and that matches the one or more persona attributes for the fictional character in the selected persona.

19. The system of claim 17, wherein the selected show description comprises information for a television show, wherein the computer readable program code is further configured to:

(e) send the information for the television show in the selected show description to a television set.

20. The system of claim 17, wherein the request further comprises one or more promotions, wherein the computer readable program code configured to select (d) is further configured to:

(d1) select the at least one of the show descriptions comprising the one or more show attributes that comprise the second image matching the first image and that matches one or more of the promotions in the request.

21. The system of claim 17, wherein each show description in the television show library corresponds to one or more of the following: an online video; a broadcast television show; or a promotional video.

22. The system of claim 17, wherein one or more of the personas in the persona database represents the fictional character created for a video game, wherein the fictional character created for the video game changes based on interaction with one or more other fictional characters of the video game according to a plot of the video game.

23. The system of claim 17, wherein one or more of the personas in the persona database represents the fictional character of a video, wherein the fictional character of the video changes based on interaction with one or more other fictional characters of the video according to a plot of the video.

24. The method of claim 1, wherein each of the one or more show descriptions further comprises a plot of a corresponding television show of a series of shows, wherein the comparing (c) and the selecting (d) further comprise:
- (c1) comparing the selected persona with the plot of the corresponding television show of the series of shows of the one or more show descriptions in the television show library; and
- (d1) selecting at least one show description of the one or more show descriptions comprising the plot of the corresponding television show of the series of shows matching the selected persona and comprising the one or more show attributes that comprise the second image matching the first image.

25. The method of claim 1, wherein each of the one or more show descriptions further comprises a plot of a corresponding episode of a television series, wherein the comparing (c) and the selecting (d) comprise:
- (c1) comparing the selected persona with the plot of the corresponding episode of the television series of the one or more show descriptions in the television show library; and
- (d1) selecting at least one show description of the one or more show descriptions comprising the plot of the corresponding episode of the television series matching the selected persona and comprising the one or more show attributes that comprise the second image matching the first image.

26. The system of claim 17, wherein each of the one or more show descriptions further comprises a plot of a corresponding television show of a series of shows, wherein the compare (c) and the select (d) comprise:
- (c1) compare the selected persona with the plot of the corresponding television show of the series of shows of the one or more show descriptions in the television show library; and
- (d1) select at least one show description of the one or more show descriptions comprising the plot of the corresponding television show of the series of shows matching the selected persona and comprising the one or more show attributes that comprise the second image matching the first image.

27. The system of claim 17, wherein each of the one or more show descriptions further comprises a plot of a corresponding episode of a television series, wherein the compare (c) and the select (d) comprise:
- (c1) compare the selected persona with the plot of the corresponding episode of the television series of the one or more show descriptions in the television show library; and
- (d1) select at least one show description of the one or more show descriptions comprising the plot of the corresponding episode of the television series matching the selected persona and comprising the one or more show attributes that comprise the second image matching the first image.

* * * * *